US011784988B2

(12) United States Patent
Lally et al.

(10) Patent No.: US 11,784,988 B2
(45) Date of Patent: *Oct. 10, 2023

(54) DATA DATA INTEGRITY SYSTEM FOR TRANSMISSION OF INCOMING AND OUTGOING

(71) Applicant: Bank of America Corporation, Charlotte, NC (US)

(72) Inventors: Joseph Thomas Lally, Charlotte, NC (US); Matthew K. Bryant, Mount Holly, NC (US); Patrick Wallace Mencias Lewis, Denver, NC (US); Jonathan P. Gaghan, Mooreseville, NC (US); Philip Lone Mintac, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,478

(22) Filed: Aug. 31, 2022

(65) Prior Publication Data

US 2022/0417227 A1    Dec. 29, 2022

Related U.S. Application Data

(63) Continuation of application No. 16/793,825, filed on Feb. 18, 2020, now Pat. No. 11,470,064.

(51) Int. Cl.
*H04L 9/40* (2022.01)
*G06F 9/54* (2006.01)

(52) U.S. Cl.
CPC .......... *H04L 63/0464* (2013.01); *G06F 9/542* (2013.01); *H04L 63/1425* (2013.01); *H04L 63/1441* (2013.01)

(58) Field of Classification Search
CPC ............. H04L 63/0464; H04L 63/1425; H04L 63/1441; G06F 9/542
See application file for complete search history.

(56) References Cited

U.S. PATENT DOCUMENTS 3,898,788 A    8/1975 Fehrer et al.
8,898,788 B1 * 11/2014 Aziz ................... H04L 63/1491
726/23

(Continued)

*Primary Examiner* — Lynn D Feild
*Assistant Examiner* — Saad Ahmad Abdullah
(74) *Attorney, Agent, or Firm* — Banner & Witcoff, Ltd.

(57) ABSTRACT

Aspects of the disclosure relate to a data integrity system for transmission of data. A computing platform may detect transmission of data to a second enterprise computing device, and may intercept the data content in transmission. Then, the computing platform may convert the data content to an electronic file in a standardized textual format. Then, the computing platform may add an alert message to a message queue indicating that the electronic file is available for processing. Subsequently, the computing platform may cause one or more content processors to process the electronic file to identify a portion of the data content for review prior to transmission, and output a notification message to the message queue providing information related to the identified portion. Then, the computing platform may modify the data content, generate a link to the modified data content, and provide the generated link to the second enterprise computing device.

20 Claims, 4 Drawing Sheets

(56) References Cited

U.S. PATENT DOCUMENTS

| | | | |
|---|---|---|---|
| 9,530,016 B1 | 12/2016 | Pomerantz | |
| 9,565,202 B1 | 2/2017 | Kindlund et al. | |
| 9,722,801 B2 | 8/2017 | Adams | |
| 9,992,217 B2 | 6/2018 | Taylor et al. | |
| 10,091,222 B1 | 10/2018 | Langton et al. | |
| 10,192,059 B2 * | 1/2019 | Grafi | G06F 21/53 |
| 10,242,669 B1 * | 3/2019 | Sandler | G10L 15/22 |
| 10,476,758 B2 * | 11/2019 | Marvin | H04L 41/50 |
| 10,931,706 B2 * | 2/2021 | Sant-Miller | H04L 63/1416 |
| 2009/0187682 A1 * | 7/2009 | Arndt | G06F 13/4059 |
| | | | 710/110 |
| 2016/0063044 A1 * | 3/2016 | Pradeep | G06F 16/182 |
| | | | 707/739 |
| 2017/0070518 A1 | 3/2017 | Manadhata et al. | |
| 2018/0191755 A1 | 7/2018 | Monaco et al. | |
| 2019/0036955 A1 | 1/2019 | Langton et al. | |
| 2019/0108355 A1 | 4/2019 | Carson | |
| 2020/0019729 A1 * | 1/2020 | Shanmugam | G06F 16/258 |
| 2020/0374221 A1 * | 11/2020 | Tandon | H04L 45/42 |
| 2020/0382543 A1 * | 12/2020 | Hoopes | H04L 63/168 |

* cited by examiner

DATA DATA INTEGRITY SYSTEM FOR TRANSMISSION OF INCOMING AND OUTGOING

CROSS REFERENCE TO RELATED APPLICATIONS

This application is a continuation of and claims priority to patent application Ser. No. 16/793,825 entitled "Data Integrity System for Transmission of Incoming and Outgoing Data" filed on Feb. 18, 2020, which is incorporated by reference in its entirety.

BACKGROUND

Aspects of the disclosure relate to deploying digital data processing systems to real-time protection of data. In particular, one or more aspects of the disclosure relate to a data integrity system for transmission of incoming and outgoing data.

Enterprise organizations may utilize various resources to support their computing infrastructure. For large enterprise organizations, maintaining, updating, and managing network activity over the various enterprise resources may be of significant importance in protecting confidential information and/or other sensitive data that is created, transmitted, and/or used for various purposes. It may be helpful to intercept data flow between servers, applications, devices, and so forth, to streamline data transmission, and protect data in transit. As data flows through the network in real-time, such detection and management of data may be time-sensitive and there may be significant advantages for the data protection to be performed in real-time as well. Ensuring that data integrity is maintained, and timely and targeted preventive measures are undertaken, in real-time with speed and accuracy, may be particularly advantageous to ensure a smooth running of an enterprise infrastructure. In many instances, however, it may be difficult to analyze and/or protect data transmission, in an organization's complex network comprising a vast number of network devices and users, while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with maintaining data integrity for transmission of incoming and outgoing data.

In accordance with one or more embodiments, a computing platform having at least one processor, and memory may detect, via a communication network, transmission of data from a first enterprise computing device to a second enterprise computing device. Subsequently, the computing platform may intercept, prior to receipt of the transmission by the second enterprise computing device, the data content. Then, the computing platform may convert the data content to an electronic file in a standardized textual format. Then, the computing platform may add an alert message to a message queue, where the alert message may indicate that the electronic file is available to be processed. Subsequently, the computing platform may cause one or more content processors to process the electronic file to identify a portion of the data content for review prior to transmission to the second enterprise computing device, where the processing may include reading the alert message in the message queue, retrieving, in response to the alert message, the electronic file, identifying the portion of the data content in the electronic file, and outputting a notification message to the message queue, where the notification message may provide information related to the identified portion of the data content. Then, the computing platform may modify, based on the notification message, the data content. Subsequently, the computing platform may generate a link to the modified data content. Then, the computing platform may provide, via the communication network and to the second enterprise computing device, the generated link.

In some embodiments, the computing platform may cause the one or more content processors to search for unauthorized code. In some embodiments, the computing platform may cause the one or more content processors to determine a severity level of the unauthorized code.

In some embodiments, the computing platform may cause the one or more content processors to search for at least one of embedded scripts and macros. In some embodiments, the computing platform may cause the one or more content processors to determine a number of the at least one of the embedded scripts and macros.

In some embodiments, the computing platform may cause the one or more content processors to search for non-public information. In some embodiments, the computing platform may cause the one or more content processors to determine an amount of the non-public information.

In some embodiments, the computing platform may identify an additional type of content potentially for review prior to transmission to the second enterprise computing device. Then, the computing platform may configure an additional content processor to identify additional data content associated with the additional type of content.

In some embodiments, the computing platform may, prior to adding the alert message to the message queue, associate a unique identifier with the electronic file.

In some embodiments, the computing platform may associate a unique identifier with the electronic file. Then, the computing platform may update the unique identifier with a status of the electronic file in the message queue.

In some embodiments, the computing platform may receive a status request for the transmission of the data content. Then, the computing platform may access the message queue to read the updated unique identifier. Subsequently, the computing platform may, based on the updated unique identifier, provide a response to the status request.

In some embodiments, the computing platform may display, in real time and via a graphical user interface, a status of the transmission of the data content.

In some embodiments, the computing platform may, prior to adding the alert message to the message queue, determine whether a portion of the electronic file has been previously processed. Then, the computing platform may, based upon a determination that the portion of the electronic file has been previously processed, mark additional portions of the electronic file to be processed. In some embodiments, the computing platform may cause at least one content processor, of the one or more content processors, to not process the electronic file.

In some embodiments, the computing platform may perform one or more of masking a portion of the identified data content, deleting a portion of the identified data content, altering a portion of the identified data content, and generating a notification that the electronic file is not available.

In some embodiments, the computing platform may determine a risk score for the data content, where the risk score is based at least in part on one of: a severity level of an unauthorized code, a number of embedded scripts, a number of embedded macros, and an amount of non-public information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
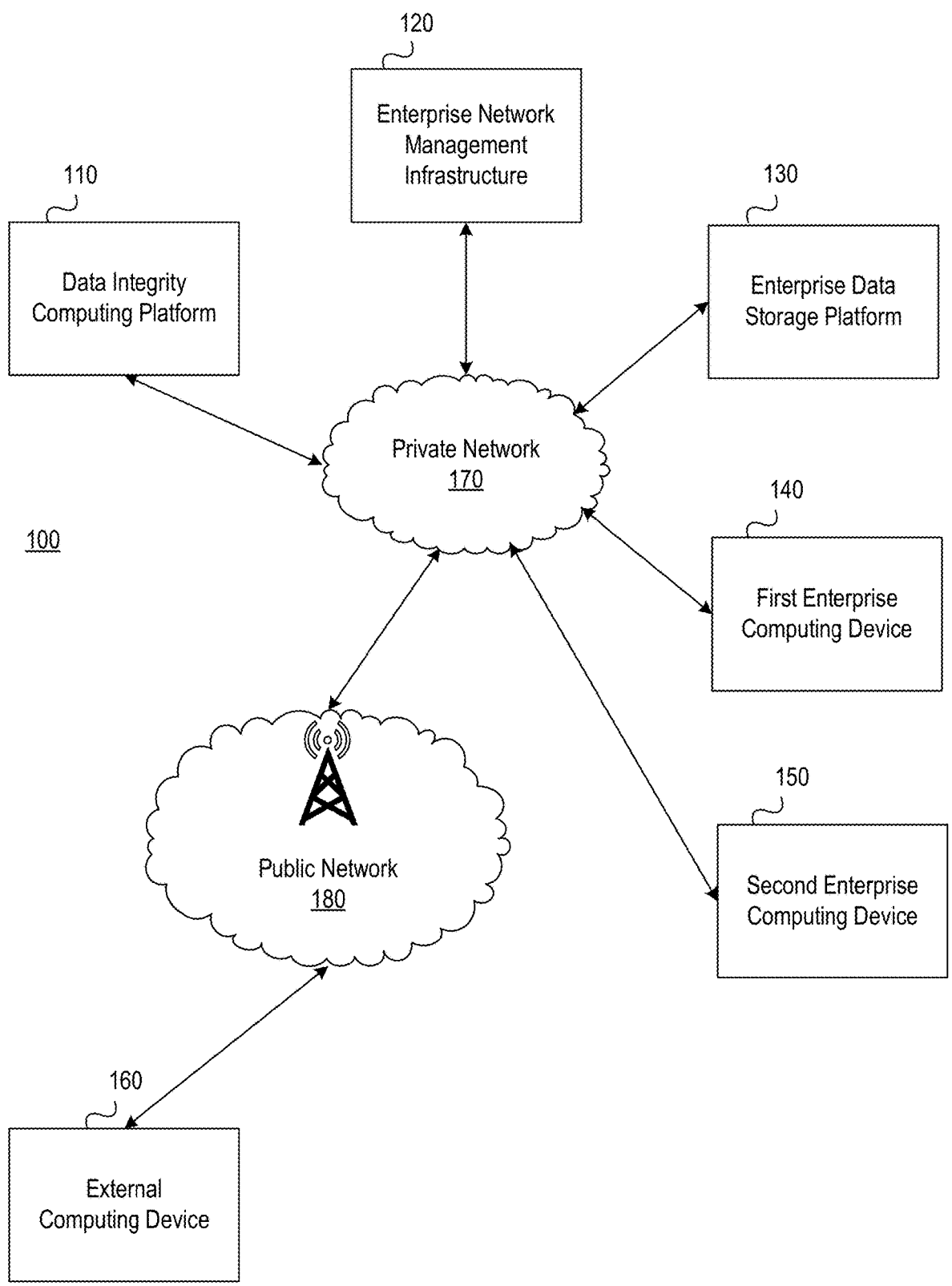
FIGS. 1A and 1B depict an illustrative computing environment for a data integrity system for transmission of incoming and outgoing data in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a data integrity system for transmission of incoming and outgoing data. For example, an enterprise network management infrastructure may deploy computing resources such as network devices, web resources, electronic mail applications, external vendor applications, mobile applications, and so forth. A large amount of data (including machine-generated data) may be exchanged between such applications, both within an enterprise organization, and between external entities and entities within the enterprise organization. In some instances, such data transmissions, unless adequately protected, may pose a large security threat to the enterprise services. For large enterprise organizations with vast amounts of deployed resources, a large number of employees, and a large client-base, data transmissions may take varied and complex forms, and it may be advantageous to provide real-time protection, including protecting data in transit.

Generally, it may not be possible to manually manage such a vast array of network applications and devices, with near-continuous flow of data. Accordingly, it may be of great significance for a large enterprise organization (e.g., financial institution), with large amounts of confidential information to protect, to detect and protect, in real-time, data transmissions.

Accordingly, aspects of this disclosure relate to automated monitoring of data transmissions between a source computing device and a destination computing device and protect such data transmissions in real-time. Intercepting, and/or protecting such data transmissions via a manual process and/or based on mental steps is unlikely because it relates to vast amounts of real-time data traffic, and such data traffic is rapidly changing in real-time over thousands of enterprise resources. Also, since the data may reside and/or be exchanged over a vast array of users, internal and external applications, and network devices, it necessitates a use of computing devices to intercept the plurality of data transmissions over networks, process such data content, and take appropriate remediation steps.

In many enterprise related applications, networks may experience bottlenecks and other data traffic congestion issues. Limits on storage capacities, memory capacities, available processing capacities for CPUs, and network bandwidth related issues, may contribute to such traffic congestion. Accordingly, techniques disclosed herein may be an effective way to alleviate some of the technical challenges encountered managing in data transmissions. Also, for example, financial institutions handle large volumes of confidential data. Such data may need to be encrypted. Generally, processing data content may be a time consuming task, with different modules working independently to process various aspects of the data content. This may also lead to less efficient resource allocation. Accordingly, a streamlined process, where multiple network devices communicate with each other, and process the data content simultaneously, may enhance functioning of the data integrity system. Also, for example, an adaptive ability to create and configure modules to process and resolve new types of data integrity issues, further enhances functioning of the data integrity system, making it more agile and scalable. It may be noted, that as data transmissions occur over a computing network, the problem of protecting data transmissions arises in the realm of networks, and as described herein, a solution is necessarily rooted in computer technology to overcome a problem arising in the realm of computer networks.

Figure 1B:
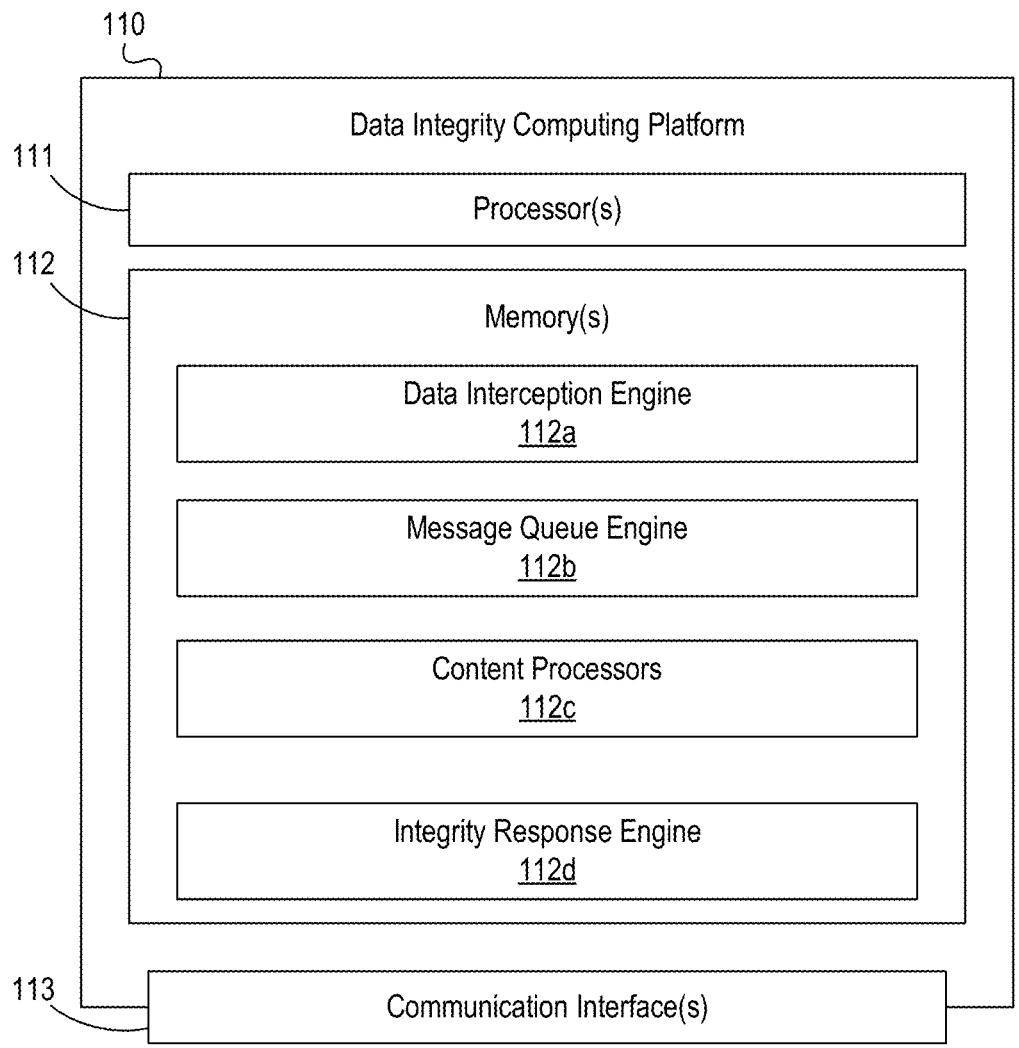

FIGS. 1A and 1B depict an illustrative computing environment for a data integrity system for transmission of incoming and outgoing data in accordance with one or more example embodiments. Referring to FIG. 1A, computing environment 100 may include one or more computer systems. For example, computing environment 100 may include data integrity computing platform 110, enterprise network management infrastructure 120, enterprise data storage platform 130, first enterprise computing device 140, second enterprise computing device 150, and external computing device 160.

As illustrated in greater detail below, data integrity computing platform 110 may include one or more computing devices configured to perform one or more of the functions described herein. For example, data integrity computing platform 110 may include one or more computers (e.g., laptop computers, desktop computers, servers, server blades, or the like) and/or other computer components (e.g., processors, memories, communication networks).

Enterprise network management infrastructure 120 may include one or more computing devices and/or other computer components (e.g., processors, memories, communication interfaces). In addition, enterprise network management infrastructure 120 may be configured to manage, host, execute, and/or otherwise provide one or more enterprise applications and/or devices (e.g., first enterprise computing device 140, second enterprise computing device 150). For example, enterprise network management infrastructure 120 may be configured to manage, host, execute, and/or otherwise provide a computing platform for various network devices and enterprise applications. In some instances, enterprise network management infrastructure 120 may be configured to provide various enterprise and/or back-office computing functions for an enterprise organization, such as a financial institution. For example, enterprise network management infrastructure 120 may include various servers and/or databases that store and/or otherwise maintain account information, such as financial account information including account balances, transaction history, account owner information, entitlements for personnel, access restriction information, enterprise policies, human resource policies, data protection, transmission, and retention policies, and/or other information. Also, for example, enterprise network management infrastructure 120 may include various servers and/or databases that may manage information technology resources for the enterprise organization. Additionally, or alternatively, enterprise network management infrastructure 120 may receive instructions from data integrity computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data, including data exchanged between network devices and/or other resources hosted, executed, and/or otherwise provided by enterprise network management infrastructure 120. Also, for example, enterprise data storage platform 130 may be configured to store and/or otherwise maintain information associated with data transmissions between enterprise applications and/or devices (e.g., first enterprise computing device 140, second enterprise computing device 150), and/or between an enterprise application and/or device and an external vendor application, user computing device (e.g., first enterprise computing device 140 and external computing device 160). Additionally, or alternatively, enterprise network management infrastructure 120 may load data from enterprise data storage platform 130, manipulate and/or otherwise process such data, and return modified data and/or other data to enterprise data storage platform 130 and/or to other computer systems included in computing environment 100.

First enterprise computing device 140 and second enterprise computing device 150 may be devices, servers, and so forth configured to host applications utilized by the enterprise organization, and managed, hosted, executed, and/or otherwise provided by enterprise network management infrastructure 120. For example, first enterprise computing device 140 may host a word processing application and second enterprise computing device 150 may host a telecommunications application. In some embodiments, first enterprise computing device 140 and second enterprise computing device 150 may be user devices that exchange data, and/or user devices that access enterprise applications. The term "enterprise application" as used herein, may generally refer to any application used within an enterprise organization. For example, an enterprise application may be a stand-alone application, or a suite of applications.

External computing device 160 may be a device, server, and so forth configured to host an application provided by a vendor, and/or a user outside the enterprise organization. For example, external computing device 160 may host a human resource application, a travel management application, a health insurance provider application, payment processing application, a voice over IP ("VOIP") service application, and so forth. The term "external application" as used herein, may generally refer to any application provided by an external vendor to an enterprise organization. In some embodiments, external computing device 160 may be a user device that may communicate with first enterprise computing device 140 and/or second enterprise computing device 150. For example, external computing device 160 may be a user device that communicates with a web portal for a financial institution.

Computing environment 100 also may include one or more networks, which may interconnect one or more of data integrity computing platform 110, enterprise network management infrastructure 120, enterprise data storage platform 130, first enterprise computing device 140, second enterprise computing device 150, and external computing device 160. For example, computing environment 100 may include private network 170 (which may interconnect, for example, data integrity computing platform 110, enterprise network management infrastructure 120, enterprise data storage platform 130, first enterprise computing device 140, second enterprise computing device 150, and/or one or more other systems (which may be associated with an organization, such as a financial institution), and public network 180 (which may interconnect, for example, external computing device 160 with private network 170 and/or one or more other systems, public networks, sub-networks, and/or the like). For example, public network 180 may interconnect external computing device 160 with first enterprise computing device 140 and/or second enterprise computing device 150 via private network 170. In some instances, public network 180 may be a high generation cellular network, such as, for example, a fifth generation ("5G") or higher cellular network. In some instances, private network 170 may likewise be a high generation cellular enterprise network, such as, for example, a 5G or higher cellular network.

In one or more arrangements, data integrity computing platform 110, enterprise network management infrastructure 120, enterprise data storage platform 130, first enterprise computing device 140, second enterprise computing device 150, and external computing device 160, and/or the other systems included in computing environment 100 may be any type of computing device capable of communicating with a user interface, receiving input via the user interface, and communicating with one or more other computing devices. For example, data integrity computing platform 110, enterprise network management infrastructure 120, enterprise data storage platform 130, first enterprise computing device 140, second enterprise computing device 150, external computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data integrity computing platform 110, enterprise network management infrastructure 120, enterprise data storage platform 130, first enterprise computing device 140, second enterprise computing device 150, and external computing device 160, may, in some instances, be special-purpose computing devices configured to perform specific functions.

Referring to FIG. 1B, data integrity computing platform 110 may include one or more processors 111, memory 112, and communication interface 113. A data bus may interconnect processor 111, memory 112, and communication interface 113. Communication interface 113 may be a network interface configured to support communication between data integrity computing platform 110 and one or more networks (e.g., public network, private network, a local network, or the like). Memory 112 may include one or more program modules having instructions that when executed by processor 111 cause data integrity computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of data integrity computing platform 110 and/or by different computing devices that may form and/or otherwise make up data integrity computing platform 110. For example, memory 112 may have, store, and/or include data interception engine 112a, message queue engine 112b, content processors 112c, and integrity response engine 112d. Data interception engine 112a may have instructions that direct and/or cause data integrity computing platform 110 to detect, via a communication network, transmission of data content from a first enterprise computing device to a second enterprise computing device. Data interception engine 112a may have instructions that direct and/or cause data integrity computing platform 110 to intercept, prior to receipt of the transmission by the second enterprise computing device, the data, as discussed in greater detail below. In some embodiments, data interception engine 112a may have instructions that direct and/or cause data integrity computing platform 110 to convert the data content to an electronic file in a standardized textual format. In some embodiments, data interception engine 112a may have instructions that direct and/or cause data integrity computing platform 110 to store the electronic file.

Message queue engine 112b may have instructions that direct and/or cause data integrity computing platform 110 to add an alert message to a message queue, where the alert message may indicate that the electronic file is available to be processed. In some embodiments, message queue engine 112b may have instructions that direct and/or cause data integrity computing platform 110 to cause one or more content processors to read the alert message in the message queue.

Content processors 112c may have instructions that direct and/or cause data integrity computing platform 110 to process the electronic file to identify a portion of the data content for review prior to transmission to the second enterprise computing device, where the processing may include retrieving, in response to the alert message, the electronic file, identifying the portion of the data content in the electronic file, and outputting a notification message to the message queue, where the notification message may provide information related to the identified portion of the data content.

Integrity response engine 112d may have instructions that direct and/or cause data integrity computing platform 110 to modify, based on the notification message, the data content. In some embodiments, integrity response engine 112d may have instructions that direct and/or cause data integrity computing platform 110 to generate a link to the modified data content. In some embodiments, integrity response engine 112d may have instructions that direct and/or cause data integrity computing platform 110 to provide, via the communication network and to the second enterprise computing device, the generated link.

Figure 2:
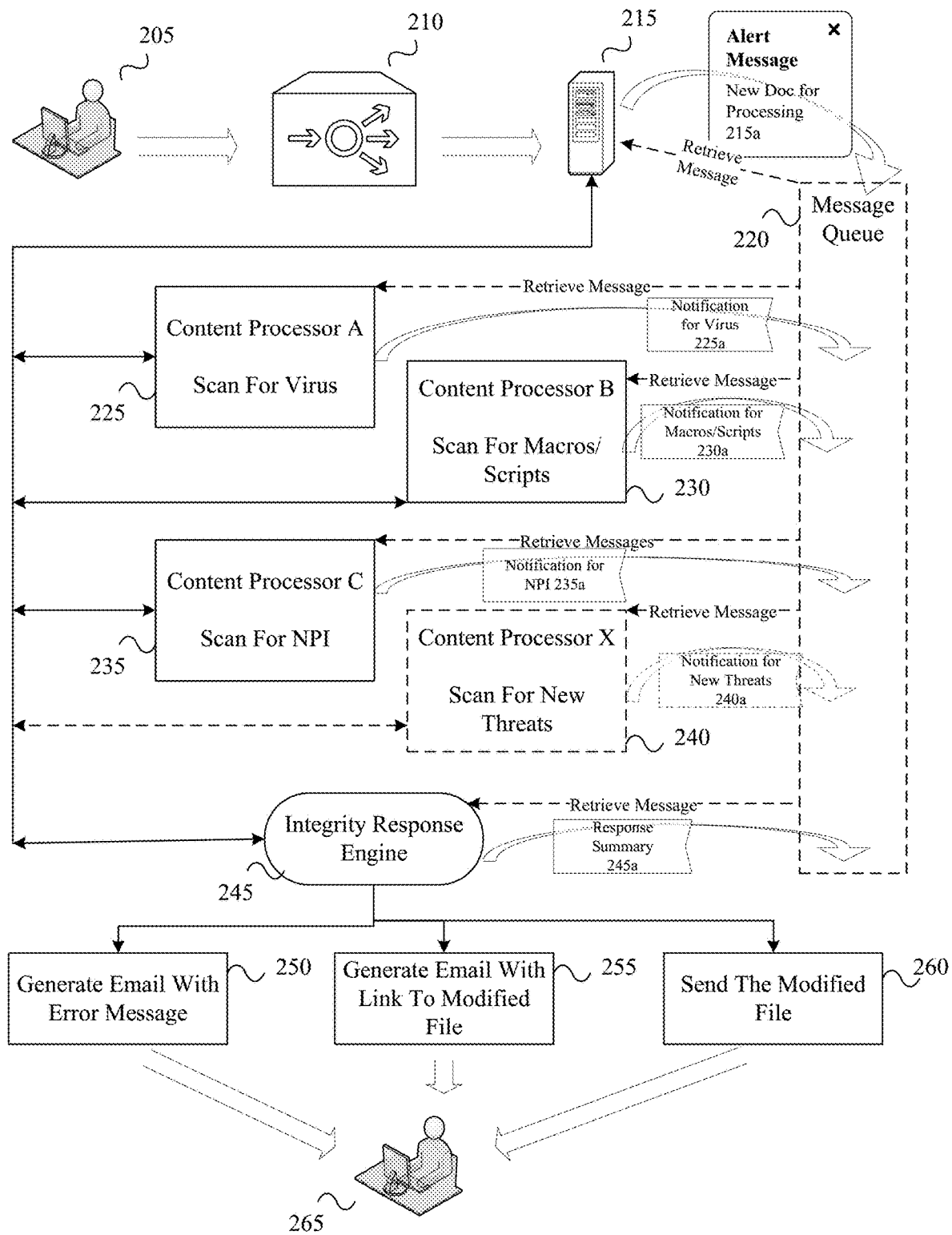
FIG. 2 depicts an illustrative network environment for a data integrity system for transmission of incoming and outgoing data in accordance with one or more example embodiments.

FIG. 2 depicts an illustrative network environment for a data integrity system for transmission of incoming and outgoing data in accordance with one or more example embodiments. Referring to FIG. 2, data integrity computing platform 110 may detect, via a communication network, transmission of data from a first computing device 205 to a second computing device 165 (e.g., second enterprise computing device 150, external computing device 160). As described herein, enterprise network management infrastructure 120 may be configured to manage, host, execute, and/or otherwise provide one or more enterprise applications. Network devices (e.g., first computing device 205, second computing device 265) within enterprise network management infrastructure 120 may generate large volumes of data transmissions, including machine-generated transmissions. For example, network devices, such as, various servers and/or databases, sensors, routers, computing devices, printers, scanners, cameras, and so forth, may generate vast amounts of data. Additional devices may include, for example, web resources, firewalls, and/or operating systems. Such data may include, for example, access data, log data, location data, data on software updates, diagnostic data, user and/or account data, trading data, and so forth.

Generally, enterprise applications and/or vendor applications may communicate with one another to exchange information via data transmissions. For example, each data transmission may originate at a first computing device (e.g., first computing device 205) and a second computing device (e.g., second computing device 265) may be an intended recipient. For example, a source application hosted by the first computing device (e.g., first computing device 205) may initiate a data transmission to request information, and the destination application hosted by the second computing device (e.g., second computing device 265) may receive this request. In response, the destination application may provide the requested information by initiating a data transmission to the requesting (e.g., source) application. Data transmissions may include exchange of data packets over a network. Content of the data transmission may include electronic communication messages, HTML documents, word processing documents, media content, audio and/or visual content, data packets associated with telecommunications, secured communications, and so forth.

In some embodiments, the source application and the destination application may be associated with an enterprise organization. For example, the source application may be, for example, hosted by the first computing device (e.g., first computing device 205), and the destination application may be, for example, hosted by the second computing device (e.g., second computing device 265). In some embodiments, the source application may be associated with an enterprise organization, and the destination application may be associated with an external vendor organization. For example, the source application may be, for example, hosted by the first computing device (e.g., first computing device 205), and the destination application may be, for example, hosted by an external computing device (e.g., second computing device 265). In some embodiments, the destination application may be associated with an enterprise organization, and the source application may be associated with an external vendor organization. For example, the source application may be, for example, hosted by an external computing device (e.g., first computing device 205), and the destination application may be, for example, hosted by the second computing device (e.g., second computing device 265).

In some embodiments, data integrity computing platform 110 may act as a data clearinghouse. For example, data integrity computing platform 110 may intercept a data transmission. In some embodiments, data may be intercepted in transit. For example, data integrity computing platform 110 may intercept, prior to receipt of the transmission by the second computing device 265, data content. Also, for example, data packets sent over a network may include headers that list source and/or destination network nodes for a data packet, a communication path for the data packet, and so forth. In some embodiments, data integrity computing platform 110 may read the headers for data packets and intercept data that have headers indicating data management protocols. For example, a header may indicate that the data content is highly confidential, and data integrity computing platform 110 may intercept the data content to apply protective measures, as described herein. As another example, a header may indicate that the data content is being transmitted by an enterprise employee with a high level of security clearance, and data integrity computing platform 110 may intercept the data to apply appropriate protective measures.

Also, for example, enterprise organizations may apply a business logic such as "permit to send," where vendor applications may be cleared to receive certain types of information. However, vendors may change over time, and/or vendor applications may change. Accordingly, allowing previously permissible data without further checks may expose the enterprise organization to security risks. Accordingly, data integrity computing platform 110 may act as a data clearinghouse to ensure that "permit to send" policies are applied in compliance with updated evaluations of enterprise risk levels.

Generally, any incoming or outgoing data content may be validated for a type of information that may be included, and to determine if the data content poses risk to the enterprise organization. In some embodiments, data integrity computing platform 110 may retrieve the data content from the first computing device 205, including a variety of sources, such as, for example, via an application programming interface ("API"). In some embodiments, data integrity computing platform 110 may monitor an enterprise device (e.g., first computing device 205) via a device access manager, and/or device driver. Also, for example, the data content may be retrieved from log files (server log files, database log files, application activity files), network management devices, network routers, and so forth.

In some embodiments, data integrity computing platform 110 may include a load balancer 210 that generally manages traffic levels for data in a network. In some embodiments, load balancer 210 may route data traffic to optimize resource allocation (e.g., allocation of network resources in a network path for a data transmission), optimize time management, reduce traffic bottlenecks, and so forth. For example, data integrity computing platform 110 may receive network traffic information from a network management device, and determine that a volume of data traffic may exceed a dynamic network capacity for the network. In some embodiments, load balancer 210 may perform load balancing activities to process the data traffic. Load balancer 210 may send the data content via a network path, where the data content may be processed by a server, such as file server 215, that may serve as a "landing zone". The landing zone may be an application server that may receive the data content, and store the data content to a file server (e.g., file server 215, enterprise data storage platform 130, and so forth). Generally, file server 215 may perform roles of a triage and complete initial processing of the data content.

In some embodiments, data integrity computing platform 110 may convert the intercepted data content to an electronic file in a standardized textual format. For example, the data content may include photographs, hyperlinks, and other non-textual information. Accordingly, file server 215 may convert the data content into, for example, an Excel format, or a Word format, with predetermined cells allocated to various types of data content. In some embodiments, data integrity computing platform 110 may parse the standardized textual format utilizing text processing techniques, and identify various types of text. For example, file server 215 may identify names, telephone numbers, credit card numbers, social security numbers, textual versions of photographs, textual versions of hyperlinks, and so forth. In some embodiments, data integrity computing platform 110 may separate such content based on categories, and/or otherwise highlight such content. In some embodiments, data integrity computing platform 110 may store the electronic file in a data repository (e.g., enterprise data storage platform 130). In some embodiments, data integrity computing platform 110 may hash contents of the standardized textual format. As described herein, data integrity computing platform 110 may associate a unique identifier with the standardized textual format.

In some embodiments, data integrity computing platform 110 may separate portions of the textual format and identify a content processor that may be suitable to process each portion. For example, file server 215 may identify potentially unauthorized code in the textual format, and identify a content processor (e.g., content processor A 225) to process the textual format. As another example, file server 215 may identify macros and/or scripts in the textual format, and identify a content processor (e.g., content processor B 230) to process the textual format. Also, for example, file server 215 may identify non-public information ("NPI") in the textual format, and identify a content processor (e.g., content processor C 235) to process the textual format.

In some embodiments, data integrity computing platform 110 may tag the appropriate portion of the textual format so that the identified content processor may retrieve the textual format and process the tagged portion. For example, file server 215 may tag the potentially unauthorized code so that the identified content processor, content processor A 225, may retrieve the textual format and process the tagged portion. As another example, file server 215 may tag the macros and/or scripts so that the identified content processor, content processor B 230, may retrieve the textual format and process the tagged portion. Also, for example, file server 215 may tag the NPI so that the identified content processor, content processor C 235, may retrieve the textual format and process the tagged portion. In some embodiments, file server 215 may separate a portion of the textual format so that the identified content processor processes the portion of the textual format, without having to process the entire electronic file.

In some embodiments, file server 215 may associate a unique identifier with the electronic file. The unique identifier may include metadata associated with the electronic file. In some embodiments, the unique identifier may include a hash of the contents of the electronic file. The unique identifier may include a digital summary of the contents of the electronic file, and may include information such as, portions of the electronic file that may have been previously processed, portions of the electronic file that may be transmitted without further review, and so forth. Generally, the unique identifier may be updated as the electronic file is processed by one or more content processors. Also, for example, a message in the message queue 220 may include details of updates applied to the unique identifier.

In some embodiments, data integrity computing platform 110 may add an alert message to a message queue, where the alert message may indicate that the electronic file is available to be processed. For example, when file server 215 has completed an initial processing of the electronic file, it may generate alert message 215a, announcing that "a new document is available for processing." The alert message may include tags for portions of the electronic document, and such tags may indicate associated content processors that may process relevant portions of the electronic document. In some embodiments, file server 215 may include network addresses for the associated content processors.

In some embodiments, data integrity computing platform 110 may determine whether a portion of the electronic file has been previously processed, and may mark additional portions of the electronic file to be processed. For example, data integrity computing platform 110 may include a cache of electronic files, or types of files and/or content, that has been previously processed. Accordingly, data integrity computing platform 110 may determine if the intercepted data content includes similar content, and prepare it for further processing. For example, especially when processing thousands or hundreds of thousands or millions of pieces of data content that are transmitted back and forth, large portions of the data contents may be similar. For example, an electronic message may include a chain of emails that were previously filtered and processed by data integrity computing platform 110. Accordingly, data integrity computing platform 110 may only process the last message in the chain of messages. Such a technique speeds up the processing, reduces memory allocation, reduces network traffic bottleneck, and also utilizes resources in an efficient manner.

In some embodiments, data integrity computing platform 110 may cause at least one content processor, of the one or more content processors, to not process the electronic file. For example, file server 215 may, based on the unique identifier, determine that a file with similar contents was previously processed, and was determined not to contain any unauthorized code. Accordingly, file server 215 may determine that the electronic document need not be processed by content processor A 225.

In some embodiments, data integrity computing platform 110 may cause one or more content processors to process the electronic file to identify a portion of the data content for review prior to transmission to the second enterprise computing device. For example, the one or more content processors may be in ongoing and/or periodic communication with message queue 220. When file server 215 releases alert message 215a to message queue 220, the one or more content processors may retrieve alert message 215a and read alert message 215a to determine their respective tasks. In some embodiments, selected content processors may retrieve and/or read alert message 215a. In some embodiments, each content processor may be privy to a certain portion of alert message 215a that may be relevant to the particular content processor.

In some embodiments, data integrity computing platform 110 may cause the one or more content processors to retrieve, in response to the alert message, the electronic file. For example, a content processor may read alert message 215a and retrieve the electronic file from file server 215. As described herein, each content processor may retrieve the entire electronic file, or a portion of the electronic file that the content processor is identified to process. In some embodiments, a content processor may read alert message 215a and determine that it does not need to process the electronic file, and therefore, may not retrieve electronic file.

Generally, when data content is transmitted, and/or a file is received, contents of the file may be analyzed for unauthorized content. In general, such action takes place at a given server. For example, contents of an entire file may be analyzed for unauthorized code. Another server may analyze the file for NPIs. However, such analysis may take place sequentially. Generally, such servers may not communicate with each other, and a given file may be processed more than once, or certain portions may not be processed at all. As described herein, the electronic file is processed simultaneously by multiple content processors, thereby saving time and computing resources. Also, for example, each content processor accesses message queue 220 to communicate with one another and file server 215, thereby maintaining consistency between different tasks, and providing comprehensive content analysis. Also, for example, file server 215 may oversee the processing, therefore ensuring timely completion of tasks by the content processors, and also providing an ability to know a precise status of the processing.

For example, data integrity computing platform 110 may cause content processor A 225 to retrieve, in response to alert message 215a, the electronic file (e.g., from file server 215). Content processor A 225 may be configured to scan the electronic file, or portions thereof, for unauthorized code (e.g., virus, malware, malicious code, trojan code, and so forth). Content processor A 225 may, upon detection of unauthorized code, generate a notification message 225a that identifies a type of unauthorized code, identifies portions of the electronic documents that include the unauthorized code, identifies a severity level of the unauthorized code, and/or recommends steps to mitigate presence of the unauthorized code. Notification message 225a may be placed in message queue 220. In some embodiments, content processor A 225 may estimate a time required to process the electronic document. Although notification message 225a is illustrated as a single message, it may comprise a plurality of messages. For example, content processor A 225 may provide a first notification message that displays a time at which processing started, and an estimated time to process the electronic file. Also, for example, content processor A 225 may provide a second notification message that indicates that unauthorized code has been detected. As another example, content processor A 225 may provide additional notification messages providing updates on the processing tasks.

As another example, data integrity computing platform 110 may cause content processor B 230 to retrieve, in response to alert message 215a, the electronic file (e.g., from file server 215). Content processor B 230 may be configured to scan the electronic file, or portions thereof, for macros and/or scripts. Content processor B 230 may, upon detection of macros and/or scripts, generate a notification message 230a that identifies a type of macros and/or scripts, identifies portions of the electronic documents that include the macros and/or scripts, identifies a number of the macros and/or scripts, and/or recommends steps to mitigate presence of the macros and/or scripts. Notification message 230a may be placed in message queue 220. In some embodiments, content processor B 230 may estimate a time required to process the electronic document. Although notification message 230a is illustrated as a single message, it may comprise a plurality of messages. For example, content processor B 230 may provide a first notification message that displays a time at which processing started, and an estimated time to process the electronic file. Also, for example, content processor B 230 may provide a second notification message that indicates that a macro and/or script has been detected. As another example, content processor B 230 may provide additional notification messages providing updates on the processing tasks.

Also, for example, data integrity computing platform 110 may cause content processor C 235 to retrieve, in response to alert message 215*a*, the electronic file (e.g., from file server 215). Content processor C 235 may be configured to scan the electronic file, or portions thereof, for non-public information ("NPI"), such as, for example, names, social security numbers, dates of birth, financial account information, account numbers, driver's license information, telephone numbers, electronic mail addresses, residential and/or work addresses, spousal information, marital information, ethnicity, sexual orientation, and so forth. Content processor C 235 may, upon detection of NPI, generate a notification message 235*a* that identifies a type of NPI, identifies portions of the electronic documents that include the NPI, identifies a number of the NPI, and/or recommends steps to mitigate presence of the NPI. Notification message 235*a* may be placed in message queue 220. In some embodiments, content processor C 235 may estimate a time required to process the electronic document. Although notification message 235*a* is illustrated as a single message, it may comprise a plurality of messages. For example, content processor C 235 may provide a first notification message that displays a time at which processing started, and an estimated time to process the electronic file. Also, for example, content processor C 235 may provide a second notification message that indicates that NPI has been detected. As another example, content processor C 235 may provide additional notification messages providing updates on the processing tasks.

As described herein, data integrity computing platform 110 may be configured to be flexible and adaptive. For example, although specific examples are illustrated with reference to content processor A 225, content processor B 230, and content processor C 235, data integrity computing platform 110 may comprise additional content processors for specific tasks. Also, for example, enterprise network management infrastructure 120 may be periodically updated with new threats, anticipates unauthorized code, new types of macros, and so forth, and enterprise network management infrastructure 120 may updated servers, such as, for example, file server 215 with such information. In some embodiments, data integrity computing platform 110 may configure one or more of content processor A 225, content processor B 230, and content processor C 235 to process such potentially unauthorized content.

In some embodiments, data integrity computing platform 110 may identify an additional type of content potentially for review prior to transmission to the second enterprise computing device. Then, data integrity computing platform 110 may configure an additional content processor to identify additional data content associated with the additional type of content. For example, new content processors may be added to perform new tasks. For example, based on changes to rules and regulations (e.g., in domestic or international jurisdictions), the electronic file may need to be processed for compliance with enterprise policies. Accordingly, data integrity computing platform 110 may create and configure a new content processor, such as, for example, content processor X 240, where the new content processor analyzes the electronic file for compliance with enterprise policies. Although content processor X 240 is illustrated as a single content processor, it represents any number of new content processors that may be created and configured to process the electronic file for new unauthorized content. For example, data integrity computing platform 110 may deploy 15 to 1500 content processors at a given time to simultaneously perform processing tasks. Content processor X 240 may provide notification messages (e.g., notification message 240*a*) to message queue 220. Such a modular architecture allows for an electronic file to be processed efficiently. For example, a first content processor may be able to process 10 files in a one second, whereas a second content processor may process one file in 20 seconds. Accordingly, if an electronic file were to be processed in a serial manner, the wait times would increase, and the first content processor may be underutilized. However, in a modular architecture with parallel processing, each content processor is able to process electronic files at their own pace without having to depend on processing times for other content processors.

Generally, content processor A 225, content processor B 230, content processor C 235, and/or content processor X 240, may process the electronic file simultaneously. For example, each content processor may simultaneously retrieve copies of the electronic file (or relevant portions thereof), from file server 215. Upon completion of processing, each content processor may return the electronic file, with appropriate annotations, to file server 215. In some embodiments, file server 215 may collate the results of the processing, and perform further steps.

As described herein, data integrity computing platform 110 may update the unique identifier with a status of the electronic file in the message queue. For example, each notification message output by a content server, may be utilized to update the unique identifier associated with the data content. Accordingly, a status of the processing, time needed to process, and such other information may be available in real-time.

In some embodiments, data integrity computing platform 110 may receive a status request for the transmission of the data content. For example, one or more network devices may send a network message requesting status. Also, for example, a security personnel, system manager, network manager, or other entity within an enterprise may request a status for the transmission of the data content. In some embodiments, data integrity computing platform 110 may access the message queue to read the updated unique identifier, and may provide a response to the status request. For example, file server 215 may access message queue 220, retrieve status information from the unique identifier, generate and transmit a status report to a requestor of the status. For example, file server 215 may indicate where the electronic file is in processing, which, if any, content processors have completed processing the electronic file, an estimated time for completion of the processing, and so forth. Accordingly, one or more devices comprising data integrity computing platform 110 may perform functions of a content delivery system. Individual electronic files may be tagged for tracking, and real-time status with information related to the processing of the electronic file may be recorded.

For example, millions of data sets may be processed, and data integrity computing platform 110 may determine average processing times for various types of data sets. For example, a data set that may have 1,000 characters may take and average of 20 seconds for a first content processor to process, 1 to 10 seconds for a second content processor, 2 seconds for a third content processor, and so forth. Accordingly, an estimate for completion may be determined based on a size of the data content.

In some embodiments, data integrity computing platform 110 may display, in real time and via a graphical user interface, a status of the transmission of the data content. For example, data integrity computing platform 110 may display such information (e.g., a status of the processing, time needed to process, severity level of threats, number of NPIs, and so forth), in real time via the graphical user interface. For example, a security group, system manager, network manager, or other entities within an enterprise may, monitor, in real-time, processing of incoming and outgoing data contents. A display may provide information about a transmission, a summary of contents, indicate content processors that may process (or not process) the file, an updated list of identified unauthorized content, and so forth.

In some embodiments, data integrity computing platform 110 may modify, based on the notification message, the data content. For example, upon completion of processing, file server 215 may modify the data content based on the corresponding electronic file. In some embodiments, data integrity computing platform 110 may perform one or more of masking a portion of the identified data content, deleting a portion of the identified data content, altering a portion of the identified data content, and causing generation of additional notifications. For example, NPI may be masked or deleted, secure information may be encrypted, scripts and/or macros may be removed or modified, photographic content may be filtered (e.g., based on enterprise use policies), and so forth.

In some embodiments, integrity response engine 245 may generate a first email 250 with an error message. For example, file server 215 may determine that the data content may not be transmitted to second computing device 265. Accordingly, integrity response engine 245 may generate the first email 250 with an error message, and send the message to second computing device 265. In some embodiments, the error message may be sent to first computing device 205, indicating that the transmission of the data content was unsuccessful. In some embodiments, integrity response engine 245 may send a message to a user associated with first computing device 205 recommending that the data content be modified in certain aspects.

In some embodiments, data integrity computing platform 110 may generate a link to the modified data content. For example, first computing device 205 may initiate transmission of an electronic message, and/or an electronic file, to second computing device 265. The data contents may be processed, as described herein. Upon completion of the processing, file server 215 may generate a link to the modified data content. The modified data content may itself be stored in a data repository (e.g., enterprise data storage platform 130). In some embodiments, a secure link to the modified data content, with appropriate access controls, may be generated. The modified data content may therefore not be transmitted outside the enterprise organization. This may ensure an additional layer of security in data transmission.

In some embodiments, data integrity computing platform 110 may provide, via the communication network and to the second enterprise computing device, the generated link. For example, integrity response engine 245 may generate a second email 255 with a link to the modified data content, and transmit the second email 255 to second computing device 265.

In some embodiments, data integrity computing platform 110 may clear the data content for transmission to second computing device 265. Accordingly, integrity response engine 245 may transmit the modified file 250.

In some embodiments, data integrity computing platform 110 may determine a risk score for the data content, where the risk score is based at least in part on one of: a severity level of an unauthorized code, a number of embedded scripts, a number of embedded macros, and an amount of non-public information. For example, content processor A 225 may indicate a type and/or severity of unauthorized code. In some embodiments, a risk level may be associated with the unauthorized code. For example, the unauthorized code may be determined to be of "High", "Medium", or "Low" risk. For example, if a virus is detected, the risk score may be 10,000. In some embodiments, a user and/or entity associated with first computing device 205 may be identified and/or notified. For example, if the entity is a vendor, other applications associated with the vendor may be placed at a higher risk of susceptibility, and the corresponding applications may be quarantined. Also, for example, if the entity is another organization, data integrity computing platform 110 may determine that the organization may be potentially vulnerable to a cyberattack, and may temporarily block incoming and outgoing communications with the organization.

Also, for example, a larger number of scripts, and/or macros, may be associated with a higher risk score, whereas a smaller number of scripts, and/or macros, may be associated with a lower risk score. Similarly, a larger number of NPIs, may be associated with a higher risk score, whereas a smaller number of NPIs, may be associated with a lower risk score. In some embodiments, weights may be associated with unauthorized content. For example, social security numbers may be given a higher weight, than, for example, initials of names.

Although file server 215 is illustrated here, for simplicity, as performing one or more tasks, file server 215 may comprise a plurality of servers, each performing the one or more tasks. For example, a first server may serve functions of a file clearinghouse. For example, the first server may generate the unique identifier. Another server may convert the data contents to an electronic file in the standardized textual format. A third server may determine if contents of the electronic file have been previously processed, and/or identify portions that may need to be processed. Also for example, another server may manage the content processors, queue appropriate tasks, receive and respond to status requests, and so forth.

As another example, integrity response engine 245 may be communicatively linked to a file server that modifies the data content based on the processing, summarizes output of the processing, provides a notification message 245a, communicates with enterprise network management infrastructure 120 to provide information to be displayed via the graphical user interface, communicates with enterprise data storage platform 130 to provide links, and so forth. For example, integrity response engine 245 may be communicatively linked to a server that is configured to serve as a "job updater." Such a job updater may be configured to include business rules and logic that may be utilized apply appropriate modifications to the data content. The business rules and logic may include enterprise policies for data transmission, file retention and transport policies, entitlements, file access control information, security clearance levels for enterprise personnel, enterprise application, enterprise devices, and so forth. For example, business rules may indicate if the data content may be accessible to an intended recipient. For example, the data content may be intended for a mortgage team within the enterprise organization. However, second computing device 265 may be associated with a trading team. Accordingly, integrity response engine 245 may apply the appropriate business logic, and prevent the data content from being transmitted to second computing device 265. In some embodiments, integrity response engine 245 may apply the appropriate business logic, and transmit the data content to the appropriate recipient (e.g., members of the mortgage team, or a manager in the mortgage team for appropriate dissemination). Also, for example, members of a support team may support online applications and/or enterprise mobile applications. Such members of the support team may not need to know a customer number, and may just need to know what a transaction identifier is for a service request. Accordingly, data content being transmitted to the support team may be modified to redact information other than the transaction identifier.

Figure 3:
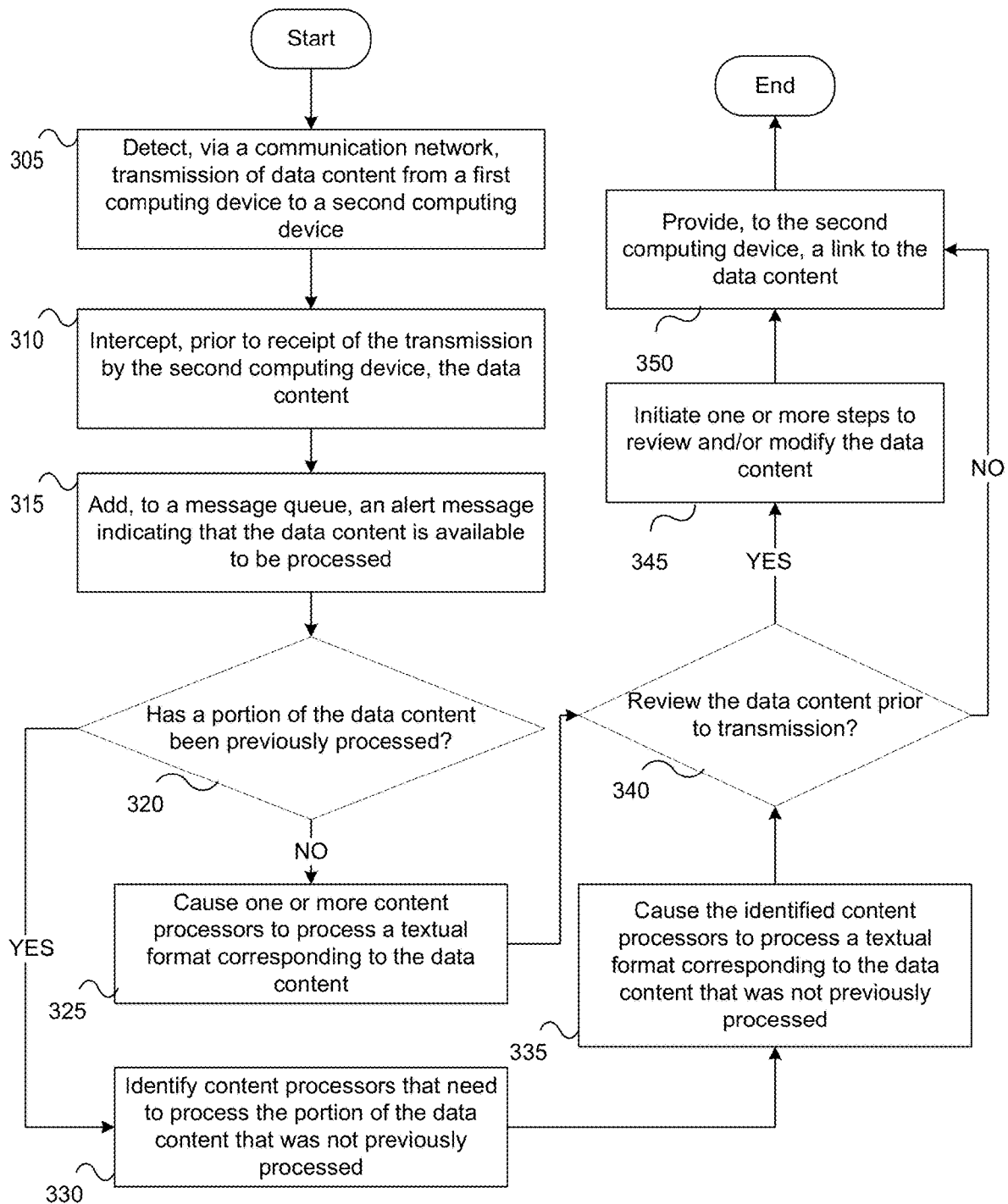
FIG. 3 depicts an illustrative method for a data integrity system for transmission of incoming and outgoing data in accordance with one or more example embodiments.

FIG. 3 depicts an illustrative method for a data integrity system for transmission of incoming and outgoing data in accordance with one or more example embodiments. Referring to FIG. 3, at step 305, a computing platform having at least one processor, and memory may detect, via a communication network, transmission of data from a first enterprise computing device to a second enterprise computing device. At step 310, the computing platform may intercept, prior to receipt of the transmission by the second enterprise computing device, the data. At step 315, the computing platform may add an alert message to a message queue, where the alert message indicates that the electronic file is available to be processed. At step 320, the computing platform may determine whether a portion of the data content has been previously processed. Upon a determination that a portion of the data content has not been previously processed, the process moves to step 325. At step 325, the computing platform may cause one or more content processors to process a textual format corresponding to the data content. The process then moves to step 340.

Upon a determination that a portion of the data content has been previously processed, the process moves to step 330. At step 330, the computing platform may identify content processors that need to process the portion of the data content that was not previously processed. At step 335, the computing platform may cause the identified content processors to process a textual format corresponding to the data content that was not previously processed. The process then moves to step 340.

Generally, the processing of the textual format may include reading the alert message in the message queue, retrieving, in response to the alert message, the electronic file, identifying the portion of the data content in the electronic file, and outputting a notification message to the message queue, where the notification message may provide information related to the identified portion of the data content.

At step 340, the computing platform may determine whether the data content needs to be reviewed prior to transmission to the second enterprise computing device. Upon a determination that the data content needs to be reviewed prior to transmission to the second enterprise computing device, the process moves to step 345. At step 345, the computing platform may initiate one or more steps to review and/or modify the data content. Upon a determination that the data content does not need to be reviewed prior to transmission to the second enterprise computing device, the process moves to step 350. At step 350, the computing platform may provide, to the second enterprise computing device, a link to the data content.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform, comprising:
at least one processor; and memory storing computer-readable instructions that, when executed by the at least one processor, cause the computing platform to:

detect, via a communication network, transmission of data content from a first enterprise computing device to a second enterprise computing device;

intercept, prior to receipt of the transmission by the second enterprise computing device, the data content;

convert the data content to an electronic file;

add an alert message to a message queue, wherein the alert message indicates that the electronic file is available to be processed;

identify, in the electronic file, a first portion of the data content corresponding to a first content category and a second portion of the data content corresponding to a second content category, wherein the first and second categories comprise different content categories;

cause one or more content processors to process the electronic file to identify a portion of the data content for review prior to transmission to the second enterprise computing device, wherein the one or more processors comprise a first content processor and a second content processor and wherein the processing comprises:

reading the alert message in the message queue;

retrieving, in response to the alert message, first and second copies of the electronic file by the first and second content processors, respectively;

simultaneously processing, by the first and second content processors, the different content categories in the first and second portions of the first and second copies, respectively;

outputting first and second notification messages by the first and second content processors, respectively, to the message queue, wherein the first and second notification messages provide information related to the first and second portions, respectively; and returning the first and second copies with annotations from the first and second content processors;

modify, based on the first and second notification messages, the data content; and provide, via the communication network and to the second enterprise computing device, the modified data content.

2. The computing platform of claim 1, wherein the instructions to cause the one or more content processors to process the electronic file comprise additional computer-readable instructions that, when executed by the at least one processor, cause the computing platform to:

cause the one or more content processors to search for unauthorized code.

3. The computing platform of claim 2, wherein the instructions to cause the one or more content processors to search for the unauthorized code comprise additional computer-readable instructions that, when executed by the at least one processor, cause the computing platform to:

cause the one or more content processors to determine a severity level of the unauthorized code.

4. The computing platform of claim 1, wherein the instructions to cause the one or more content processors to process the electronic file comprise additional computer-readable instructions that, when executed by the at least one processor, cause the computing platform to:

cause the one or more content processors to search for at least one of embedded scripts and macros.

5. The computing platform of claim 4, wherein the instructions to cause the one or more content processors to search for the at least one of embedded scripts and macros comprise additional computer-readable instructions that, when executed by the at least one processor, cause the computing platform to:

cause the one or more content processors to determine a number of the at least one of the embedded scripts and macros.

6. The computing platform of claim 1, wherein the instructions to cause the one or more content processors to process the electronic file comprise additional computer-readable instructions that, when executed by the at least one processor, cause the computing platform to:

cause the one or more content processors to search for non-public information.

7. The computing platform of claim 6, wherein the instructions to cause the one or more content processors to search for the non-public information comprise additional computer-readable instructions that, when executed by the at least one processor, cause the computing platform to:

cause the one or more content processors to determine an amount of the non-public information.

8. The computing platform of claim 1, wherein the instructions to cause the one or more content processors to process the electronic file comprise additional computer-readable instructions that, when executed by the at least one processor, cause the computing platform to:

identify an additional type of content potentially for review prior to transmission to the second enterprise computing device; and configure an additional content processor to identify additional data content associated with the additional type of content.

9. The computing platform of claim 1, wherein the instructions to add the alert message to the message queue comprise additional computer-readable instructions that, when executed by the at least one processor, cause the computing platform to:

prior to adding the alert message to the message queue, associate a unique identifier with the electronic file.

10. The computing platform of claim 1, comprising additional computer-readable instructions that, when executed by the at least one processor, cause the computing platform to:

associate a unique identifier with the electronic file; and update the unique identifier with a status of the electronic file in the message queue.

11. The computing platform of claim 10, comprising additional computer-readable instructions that, when executed by the at least one processor, cause the computing platform to:

receive a status request for the transmission of the data content;

access the message queue to read the updated unique identifier; and based on the updated unique identifier, provide a response to the status request.

12. The computing platform of claim 1, comprising additional computer-readable instructions that, when executed by the at least one processor, cause the computing platform to:

display, in real time and via a graphical user interface, a status of the transmission of the data content.

13. The computing platform of claim 1, wherein the instructions to add the alert message to the message queue comprise additional computer-readable instructions that, when executed by the at least one processor, cause the computing platform to:
  prior to adding the alert message to the message queue, determine whether a portion of the electronic file has been previously processed; and
  based upon a determination that the portion of the electronic file has been previously processed, mark additional portions of the electronic file to be processed.

14. The computing platform of claim 13, wherein the instructions to mark the additional portions of the electronic file to be processed comprise additional computer-readable instructions that, when executed by the at least one processor, cause the computing platform to:
  cause at least one content processor, of the one or more content processors, to not process at least one of the additional portions of the electronic file.

15. The computing platform of claim 1, wherein the instructions to modify the data content comprise additional computer-readable instructions that, when executed by the at least one processor, cause the computing platform to:
  perform one or more of masking the identified portion of the data content, deleting the identified portion of the data content, altering the identified portion of the data content, and generating a notification that the electronic file is not available.

16. The computing platform of claim 1, comprising additional computer-readable instructions that, when executed by the at least one processor, cause the computing platform to:
  determine a risk score for the data content, wherein the risk score is based at least in part on one of: a severity level of an unauthorized code, a number of embedded scripts, a number of embedded macros, and an amount of non-public information.

17. A method, comprising:
  at a computing platform comprising at least one processor, and memory:
    detecting, via a communication network, transmission of data content from a first enterprise computing device to a second enterprise computing device;
    intercepting, prior to receipt of the transmission by the second enterprise computing device, the data content;
    converting the data content to an electronic file;
    adding an alert message to a message queue, wherein the alert message indicates that the electronic file is available to be processed;
    identifying, in the electronic file, a first portion of the data content corresponding to a first content category and a second portion of the data content corresponding to a second content category;
    cause one or more content processors to process the electronic file to identify a portion of the data content for review prior to transmission to the second enterprise computing device, wherein the one or more processors comprise a first content processor and a second content processor and wherein the processing comprises:
      reading the alert message in the message queue;
      retrieving, in response to the alert message, first and second copies of the electronic file by the first and second content processors, respectively;
      simultaneously processing, by the first and second content processors, the first and second portions of the first and second copies, respectively, wherein the first portion contains a different content category than the second portion;
      outputting a notification message to the message queue, wherein the notification message provides information related to the identified portion of the data content;
      outputting first and second notification messages by the first and second content processors, respectively, to the message queue, wherein the first and second notification messages provide information related to the first and second portions, respectively; and
      returning the first and second copies with annotations from the first and second content processors;
    modifying, based on the first and second notification messages, the data content; and
    providing, via the communication network and the second enterprise computing device, the modified data content.

18. The method of claim 17, wherein the processing the electronic file comprises causing the one or more content processors to:
  determine a risk score for the data content, wherein the risk score is based at least in part on one of: a severity level of an unauthorized code, a number of embedded scripts, a number of embedded macros, and an amount of non-public information.

19. The method of claim 17, further comprising:
  identifying an additional type of content potentially for review prior to transmission to the second enterprise computing device; and
  configuring an additional content processor to identify additional data content associated with the additional type of content.

20. One or more non-transitory computer-readable media storing instructions that, when executed by a computing platform comprising at least one processor, and memory, cause the computing platform to:
  detect, via a communication network, transmission of data content from a first enterprise computing device to a second enterprise computing device;
  intercept, prior to receipt of the transmission by the second enterprise computing device, the data content;
  convert the data content to an electronic file;
  add an alert message to a message queue, wherein the alert message indicates that the electronic file is available to be processed;
  identify, in the electronic file, a first portion of the data content corresponding to a first content category and a second portion of the data content corresponding to a second content category;
  cause one or more content processors to process the electronic file to identify a portion of the data content for review prior to transmission to the second enterprise computing device, wherein the one or more processors comprise a first content processor and a second content processor and wherein the processing comprises:
    reading the alert message in the message queue;
    retrieving, in response to the alert message, first and second copies of the electronic file by the first and second content processors, respectively;
    simultaneously processing, by the first and second content processors, the first and second portions of the first and second copies, respectively, wherein the first portion contains a different content category than the second portion;

outputting first and second notification messages by the first and second content processors, respectively, to the message queue, wherein the first and second notification messages provide information related to the first and second portions, respectively; and returning the first and second copies with annotations from the first and second content processors;

modify, based on the first and second notification messages, the data content; and provide, via the communication network, the modified data content.

\* \* \* \* \*